US010753239B2

(12) United States Patent
Rabhi

(10) Patent No.: US 10,753,239 B2
(45) Date of Patent: Aug. 25, 2020

(54) HYDRAULIC PISTON WITH A COOLING AND LUBRICATING GASKET VALVE

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 598 days.

(21) Appl. No.: 15/615,595

(22) Filed: Jun. 6, 2017

(65) Prior Publication Data

US 2018/0347417 A1   Dec. 6, 2018

(30) Foreign Application Priority Data

Jun. 6, 2017   (FR) ..................... 1755029

(51) Int. Cl.
| | | |
|---|---|---|
| *F01M 1/06* | (2006.01) |
| *F04B 53/08* | (2006.01) |
| *F04B 53/14* | (2006.01) |
| *F04B 53/18* | (2006.01) |
| *F16J 1/00* | (2006.01) |
| *F03C 1/28* | (2006.01) |
| *F04B 1/124* | (2020.01) |
| *F04B 1/0408* | (2020.01) |
| *F01C 13/04* | (2006.01) |
| *F01C 20/26* | (2006.01) |
| *F01L 9/02* | (2006.01) |
| *F01M 9/10* | (2006.01) |
| *F01L 1/08* | (2006.01) |
| *F01M 11/00* | (2006.01) |

(52) U.S. Cl.
CPC ............... *F01M 1/06* (2013.01); *F01C 13/04* (2013.01); *F01C 20/265* (2013.01); *F01L 9/025* (2013.01); *F01M 9/106* (2013.01); *F03C 1/0406* (2013.01); *F03C 1/0605* (2013.01); *F04B 1/0408* (2013.01); *F04B 1/124* (2013.01); *F04B 53/08* (2013.01); *F04B 53/143* (2013.01); *F04B 53/18* (2013.01); *F16J 1/008* (2013.01); *F01L 1/08* (2013.01); *F01M 2011/0062* (2013.01)

(58) Field of Classification Search
CPC ........ F02M 59/04; F02M 59/28; F02M 59/24; F04B 49/08; F04B 49/065; F04B 1/30; F04B 1/306; F04B 1/2064; F04B 1/2035; F04B 2205/05; F04B 7/00; F04B 7/02; F04B 39/0292; F04B 1/124; F04B 1/0408; F04B 53/18; F04B 53/166; F04B 53/143; F04B 53/08; F02D 41/3082; F01P 3/06; F03C 1/0605; F03C 1/0652; F03C 1/0406; F16N 13/02; F16N 31/02; F01M 9/10; F01M 9/106; F01M 1/06; F01M 2011/0062; F16K 47/00; F16J 1/008; F01L 9/025; F01L 1/08; F01C 20/265; F01C 13/04
USPC ............................................. 251/48, 53, 55
See application file for complete search history.

(56) References Cited

U.S. PATENT DOCUMENTS

| | | | | |
|---|---|---|---|---|
| 2004/0104076 A1* | 6/2004 | Heo | ................... | F04B 35/045 184/6.16 |
| 2017/0184009 A1* | 6/2017 | Vianney | ................... | F01P 3/06 |

* cited by examiner

*Primary Examiner* — Essama Omgba
*Assistant Examiner* — Christopher J Brunjes
(74) *Attorney, Agent, or Firm* — Young & Thompson

(57) ABSTRACT

The hydraulic piston (1) constitutes a hydraulic chamber (5) with a cylinder (4) and has a cylindrical body (6) connected—from the side of the chamber (5)—by a link-stop valve (3) to a cooling and lubricating gasket valve (2) which is passed right through by a flow calibration opening (27), the valve (2) being able to move in longitudinal translation over a short stroke with respect to the body (6) or to be held at a distance from the body (6) by the valve link-stop (3), a valve return spring (30) tending to move the valve (2) away from the cylindrical body (6).

12 Claims, 5 Drawing Sheets

HYDRAULIC PISTON WITH A COOLING AND LUBRICATING GASKET VALVE

BACKGROUND OF THE INVENTION

Field of the Invention

This invention relates to a hydraulic piston with a cooling and lubricating gasket valve, said piston working with a cylinder to form, for example, the hydraulic chamber of variable volume of a pump or an axial- or radial-piston hydraulic motor.

Description of the Related Art

The sealing of the pistons of the hydraulic pumps and motors with axial or radial pistons is most often obtained by leaving a small diametral clearance between the pistons and the cylinder with which they operate. By way of example, said clearance may be from twenty to forty micrometers for a piston measuring twenty millimeters in diameter. Such a small diametral clearance makes it possible to obtain acceptable sealing levels up to operating pressures on the order of three to five hundred bars, provided that sufficient cover is provided between the piston and the cylinder in which said piston translates.

Providing a small diametral clearance between the piston and its cylinder forms a simple and robust sealing solution. The production cost of said solution remains moderate, despite the high machining precision it requires.

It should be noted that the pistons of axial piston hydraulic pumps and motors are usually terminated by articulated shoes which slide on an inclined or inclinable plate depending on whether said pumps or the motors are of fixed displacement or variable displacement. When said plate is inclined and pressure is applied to any one of the pistons by any hydraulic fluid, for example by oil, the force exerted by the articulated shoe of said piston on said plate by reaction, a radial force between said piston and the cylinder with which it operates.

Said radial force generates a contact pressure between said piston and its cylinder. Said pressure applies first to the end of said piston which is opposite the articulated shoe and second to the end of said cylinder which opens out in the direction of the inclined plate.

The pistons of the hydraulic pumps and motors as described above are responsible for energy losses of various types which reduce the total energy efficiency of said pumps and said motors.

Among these energy losses, hydraulic fluid leaks are first to be noticed. Under the effect of the pressure, hydraulic fluid is expelled from the hydraulic chamber via the space formed by the diametral clearance left between the piston and the cylinder and then it outflows at the end of the cylinder which opens in the direction of the inclined plate. It is also noted that by performing reciprocating movements in its cylinder, the piston produces a pumping effect at the level of the diametral clearance left between it and said cylinder, which increases the hydraulic leakage rate.

The shear of the hydraulic fluid which is interposed between the piston and the cylinder also counts amongst said energy losses. Said shear produces a resistant force which opposes the rotation of the pump or of the hydraulic motor. This shear force is all the more important since, on the one hand, the hydraulic fluid is viscous and, on the other hand, the diametral clearance left between the piston and the cylinder is small.

Finally, said energy losses also result from the force exerted by the piston shoe on the inclined plate. Said force is translated by radial forces exerted by the piston on its cylinder. Conjugated with the movement of said piston in said cylinder, said radial forces generate energy losses which are the result of said forces by the coefficient of friction between the piston and its cylinder multiplied by the distance traveled by said piston in said cylinder.

As can be readily understood from the above, in order to reduce the total energy loss produced by the pistons of the hydraulic pumps and motors, it is necessary, as a minimum, to pursue the triple objective of limiting hydraulic leaks as far as possible, reducing shear losses of the hydraulic fluid to a minimum and minimizing the frictional losses produced at the contacts between the piston and its cylinder.

Nevertheless, there are various contradictions that oppose the simultaneous pursuit of these three objectives.

Indeed, in the state of the art and technique, reducing the leakage of hydraulic fluid cannot be done by further reducing the diametral clearance left between the piston and its cylinder because the shear losses would increase in an unacceptable manner.

These increased shear losses would result in an increased amount of heat emitted in a smaller volume of hydraulic fluid included in the diametral clearance left between the piston and its cylinder. As a result of this situation, the temperature of said fluid would increase drastically while its viscosity would decrease. Said fluid would lose a large part of its lubricating qualities which would increase the friction losses which in return would further increase the amount of heat received by the hydraulic fluid included in the diametral clearance.

There would then be a burst of heat emissions and of increase in the local temperature of the hydraulic fluid, and once a certain threshold is passed, said fluid included in the diametral clearance left between the piston and its cylinder would be destroyed by coking. In addition to this, the temperature of the piston could rise to the point that said piston expands faster than the cylinder in which it translates. This latter effect would lead to seizure of said piston in said cylinder.

Reduction of the diametral clearance left between the piston and its cylinder in order to reduce the leakage of hydraulic fluid is therefore barely possible, and all the more so that in order to reduce the losses through shear forces, said clearance would instead need to be increased. In fact, losses due to shear forces increase approximately inversely and proportionally to said clearance.

In addition to reducing shear losses, increasing said clearance would also reduce the friction losses induced by the radial forces exerted by the piston on its cylinder. Indeed, to reasonably increase the diametral clearance left between the piston and the cylinder would favor the formation and maintenance of a hydrodynamic lubrication regime between said piston and said cylinder, in particular because the hydraulic fluid film of oil, for example—would be thicker, and because the latter would be kept at a lower temperature.

However, increasing the diametral clearance between the piston and its cylinder is not the solution either because this would be to the detriment of the hydraulic leaks which pass between these two parts, which would increase drastically.

Since the objectives which have just been described are contradictory in their realization, the diametral clearance between the pistons and the cylinders of the axial or radial piston hydraulic pumps and motors according to the Prior Art results from a compromise between the hydraulic leakage on the one hand, and the oil shear losses and mechanical friction on the other.

It could be imagined that this compromise would be resolved by placing a seal on the piston either at the end of said piston closest to the hydraulic chamber or at its middle, taking care that said seal would never be able to exit the cylinder. Thus, it would be possible to have a strong diametral clearance between the piston and its cylinder since the sealing would no longer be dependent on the clearance.

The problem with any seal or sealing ring is that the piston is no longer lubricated enough in its cylinder because too little oil is introduced into the space formed by the diametral clearance left between the piston and its cylinder.

In addition, the oil must be continuously renewed to remove the heat emitted by leaks, shear losses and residual friction losses. Installing a seal on the pistons of hydraulic pumps and hydraulic motors with axial or radial pistons thus inevitably leads to drying of the cylinder and to seizing of the piston in said cylinder and premature aging of the hydraulic fluid locally subjected to excessive temperatures.

Furthermore, it will be noted that certain pumps or hydraulic motors comprise mechanical parts which are positioned opposite the hydraulic chamber and which are lubricated and/or cooled by the leakage flow rate passing between the piston and the cylinder. Preventing any leakage of hydraulic fluid between the piston and its cylinder would lead to having to lubricate said parts with a voluntary oil supply via an injector, for example.

BRIEF SUMMARY OF THE INVENTION

In order to solve these different problems, the hydraulic piston with a cooling and lubricating gasket valve according to the invention makes it possible, according to its embodiment:

Fitting a gasket or sealing ring between the piston and its cylinder which controls leakage of hydraulic fluid passing in the diametral clearance left between the piston and its cylinder when high pressure prevails in the hydraulic chamber of the hydraulic pump or the hydraulic motor which receives it;

Allowing the leakage flow of the lubricating oil and cooling oil to pass through the diametral clearance between the piston and its cylinder only when low pressure prevails in the hydraulic chamber of the hydraulic pump or of the hydraulic motor which receives it;

Optimizing the diametral clearance left between the piston and its cylinder in order to minimize the losses by shear and friction by increasing only marginally the energy losses due to the leakage of hydraulic fluid passing through the diametrical clearance left between the piston and its cylinder;

Significantly increasing the output of any hydraulic pump or hydraulic motor that receives it;

Increasing only marginally the production cost of the pump or the hydraulic motor that receives it.

It is understood that, in addition to its application in hydraulic pumps and axial or radial piston hydraulic motors, the hydraulic piston with cooling and lubricating gasket valve according to the invention may be applied to any other pump, engine, engine pump or jack, whether these components are hydraulic or pneumatic, and since the configuration of said components advantageously makes it possible to exploit said piston according to the invention.

The other characteristics of this invention have been described in the specification and in the secondary dependent Claims directly or indirectly dependent on the main Claim.

The hydraulic piston comprises a cylindrical body housed with a small clearance in a cylinder, said piston being translatable in said cylinder with which it forms a hydraulic chamber of variable volume, a first end of said piston having a compression face opening into the hydraulic chamber to receive the pressure of a fluid while the other end of said piston has a piston has a piston support surface to exert force on the transmission means.

The hydraulic piston according to this invention comprises:

At least one cooling and lubricating gasket valve positioned on the side of the compression surface and in the extension of the cylindrical body with respect to which it can move in longitudinal translation over a short stroke, said valve comprising, first, a piston-side axial valve surface having a circular flow closure seal defining a circular contact line which is engageable with a valve contact surface provided on the compression face, the diameter of said line being less than that of the cylinder, said valve second having an outer cylindrical valve surface which exposes the sealing means which can come into contact with the cylinder and remain sealed, said cylindrical surface being housed with a diametral clearance in said cylinder, while said valve comprises, thirdly, a chamber-side axial valve surface which faces the hydraulic chamber;

at least one intermediate fluid outlet chamber, in particular formed inside the circular contact line, by the piston-side axial valve surface and by the compression surface;

At least one flow calibration opening which passes through the cooling and lubricating gasket valve throughout, principally in the axial direction, the hydraulic chamber communicating with the intermediate fluid outlet chamber via said opening;

at least one valve link-stop that connects the cooling and lubricating seal gasket to the cylindrical body, said link-stop allowing said gasket to move towards said body at the point where the circular flow closure seal makes contact with the valve contact surface, while said link-stop prevents said valve from moving away from said body more than a certain distance;

At least one valve return spring which tends to move the cooling and lubricating gasket valve away from the cylindrical body.

The hydraulic piston according to this invention comprises a valve return spring which is wholly or partly housed within the intermediate fluid outlet chamber.

The hydraulic piston according to this invention comprises sealing means which are constituted by at least one cutting segment housed in a segment groove provided in the cooling and lubricating gasket valve or added in whole or in part to said valve, said groove opening at the external cylindrical surface of the valve.

The hydraulic piston according to this invention comprises sealing means which are constituted by at least one flexible circular seal housed in a segment groove provided in the cooling and lubricating gasket valve or added wholly or partly to said gasket valve, said groove opening at the external cylindrical surface of the valve.

The hydraulic piston according to this invention comprises a cylindrical body which has an anti-shear release groove.

The hydraulic piston according to this invention comprises a diameter of the axial end of the cylindrical body located on the side of the compression surface which gradually reduces to a certain length to form a lift relief.

The hydraulic piston according to this invention comprises a diameter of the axial end of the cylinder opposite the hydraulic chamber which gradually increases to a certain length to develop a lift.

The hydraulic piston according to this invention comprises a valve link-stop which is constituted by a link-stop pin which emerges integrally from the compression face in order first to pass through the cooling and lubricating gasket valve via a link-stop opening provided in said valve and on the other hand, to protrude from the axial chamber-side valve surface in order to expose a valve stop to said surface.

The hydraulic piston according to this invention comprises a flow calibration opening which is constituted by the clearance left between the link-stop pin and the link-stop opening.

The hydraulic piston according to this invention comprises a valve link-stop which consists of a valve link-stop extender which emerges integrally from the piston-side axial valve surface, first, in order to penetrate into the cylindrical body via a link-stop shaft provided in said body and, second, to expose an extension stop which functions with a stop shaft that exposes the link-stop shaft.

The hydraulic piston according to this invention comprises an extension stop which is constituted by at least one flexible claw which snaps into an abutment groove which forms the stop shaft.

The hydraulic piston according to this invention comprises a valve return spring which is wholly or partly housed in an axially extending recess in the valve link-stop extender.

BRIEF DESCRIPTION OF THE DRAWINGS

The description that follows with regard to the attached drawings, given as non-limiting examples, will make it possible to better understand the invention, the characteristics which it presents and the advantages which are likely to be obtained.

DETAILED DESCRIPTION OF THE PREFERRED EMBODIMENTS

Figure 1:
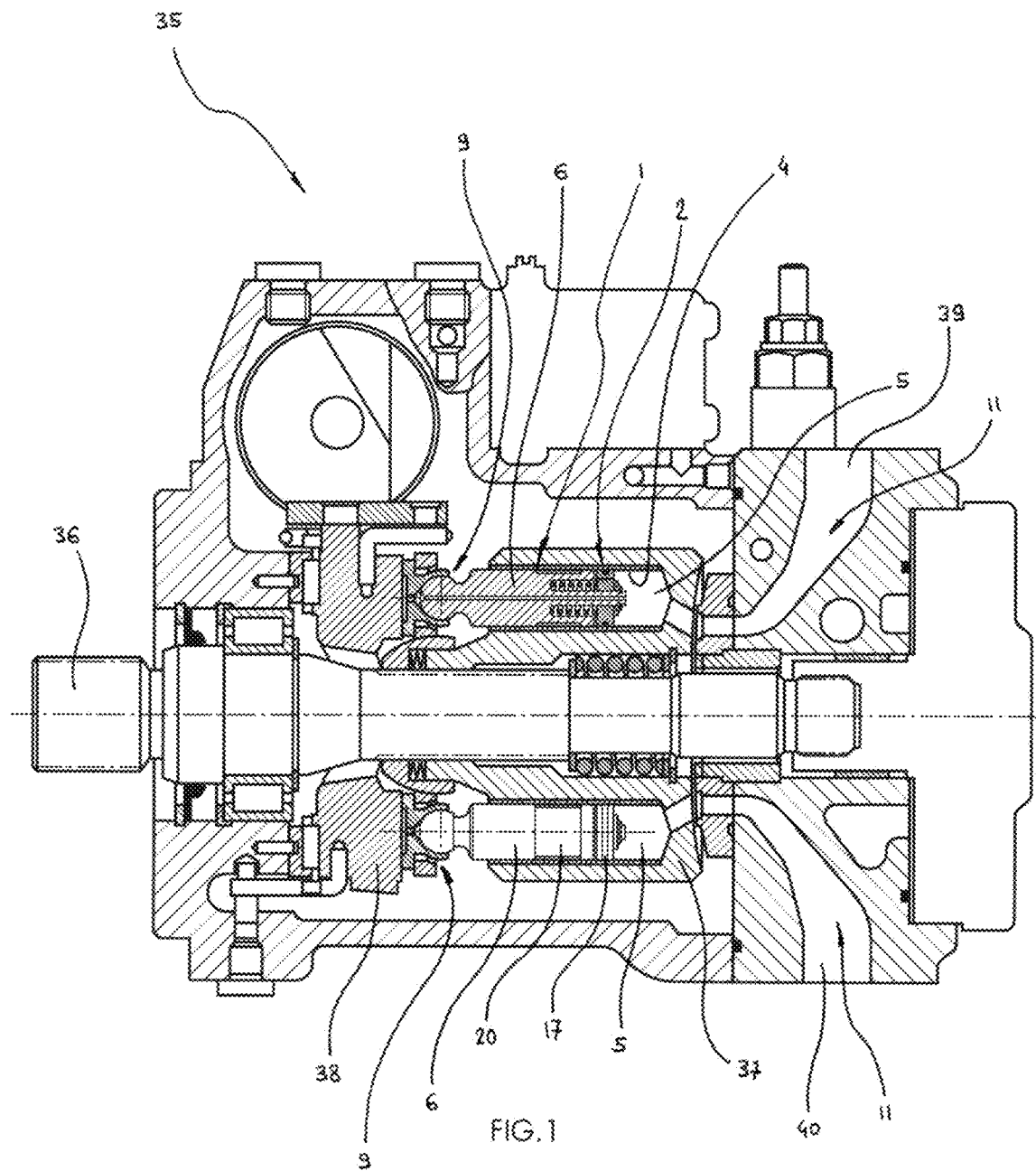
FIG. 1 is a schematic cross-sectional view of a variable-displacement axial piston hydraulic pump equipped with hydraulic pistons with a cooling and lubricating gasket valve according to the invention.

FIGS. 1 to 9 show the hydraulic piston 1 with a cooling and lubricating gasket valve 2, various details of its components, its variants and its accessories.

As can be seen mainly in FIGS. 1 to 4, the hydraulic piston 1 is constituted by a cylindrical body 6 housed with a small clearance in a cylinder 4. Said piston 1 can translate in the said cylinder 4 with which it forms a hydraulic chamber 5 of a variable volume.

FIGS. 1 to 9 clearly show that a first end of said piston 1 has a compression surface 10 opening into the hydraulic chamber 5 to receive the pressure of a fluid 11 while a second end of said piston 1 has a piston support surface 8 for exerting a force on a transmission means 9.

FIGS. 1 to 9 illustrate that the hydraulic piston 1 with a cooling and lubricating gasket valve 2 according to the invention comprises at least one cooling and lubricating gasket valve 2 positioned on the side of the compression surface 10 and in the extension of the cylindrical body 6 with respect to which it can move in longitudinal translation over a short stroke.

The cooling and lubricating gasket valve 2 comprises first, a piston-side axial valve surface 23 which has a circular flow closure seal surface 24 defining a circular contact line 25 which can come into contact with a contact surface 26 formed on the compression surface 10, the diameter of said line 25 being less than that of the cylinder 4.

Furthermore, second, the cooling and lubricating gasket valve 2 has an external cylindrical valve surface 14 which exposes sealing means 16 which can come into contact with the cylinder 4 and remain sealed, said cylindrical surface 14 being housed with a diametral clearance in said cylinder 4.

Finally, and thirdly, the cooling and lubricating gasket valve 2 comprises a chamber-side axial valve surface 15 which faces the hydraulic chamber 5.

It will be noted that according to a particular embodiment of the hydraulic piston 1 according to the invention, the sealing means 16 can simply consist of a very small diametral clearance left between the external cylindrical surface of the valve 14 and the cylinder 4.

Figure 8:
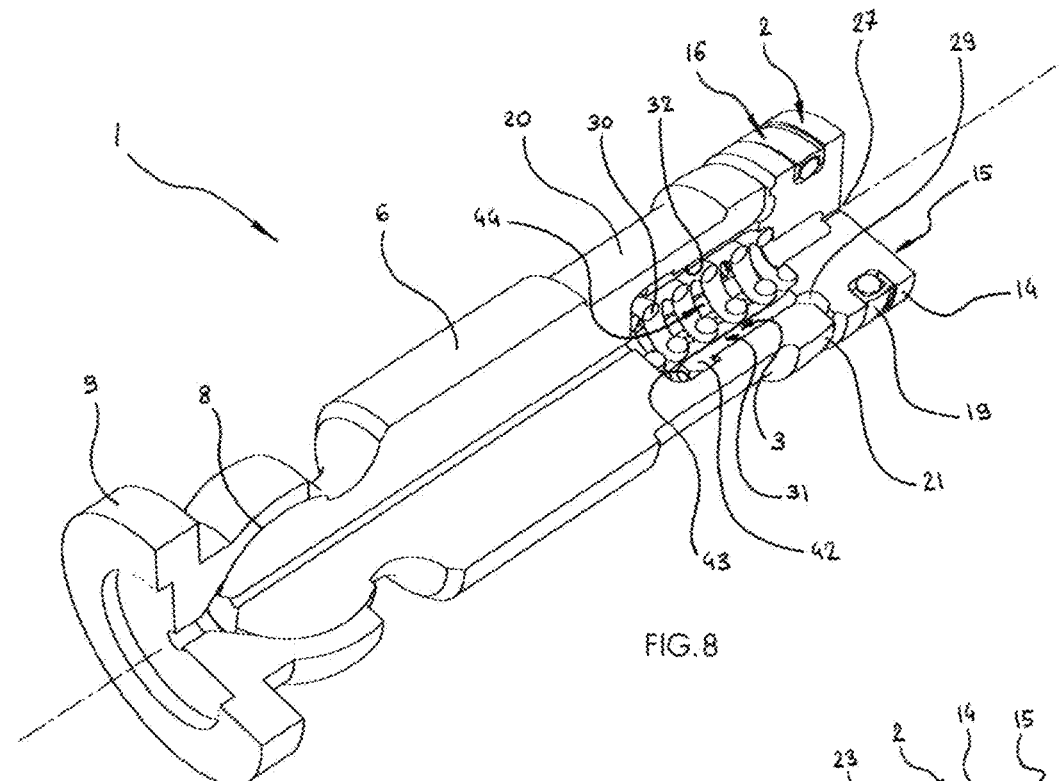
FIG. 8 is a three-dimensional cut-away view of the variant shown in FIG. 3 of the hydraulic piston with a cooling and lubricating gasket valve according to the invention, said piston being assembled.

In FIGS. 2 to 6 and in FIG. 8, it will be noted that the hydraulic piston 1 with a cooling and lubricating gasket valve 2 according to the invention has at least one intermediate fluid outlet chamber 29, which is formed inside of the circular contact line 25, by the axial surface of the valve on the piston side 23 and by the compression surface 10.

It will also be noted in FIGS. 2 to 8 that the hydraulic piston 1 with a cooling and lubricating gasket valve 2 according to the invention has at least one flow calibration opening 27 which passes through the cooling and lubricating gasket valve 2 from above to the other mainly in the axial direction, the hydraulic chamber 5 communicating with the intermediate fluid outlet chamber 29 via said opening 27.

In FIGS. 2 to 9, it is in particular apparent that the hydraulic piston 1 according to the invention comprises at least one valve link-stop 3 which connects the cooling-lubricating gasket valve 2 to the cylindrical body 6, said link-stop 3 allowing said valve 2 to approach said body 6 to the point that the circular flow closure seal 24 comes into contact with the valve contact surface 26, while said link-stop 3 prohibits said valve 2 from moving away from said body 6 by more than a certain distance.

It will be noted that according to a particular embodiment of the hydraulic piston 1 according to the invention, the valve link-stop 3 can allow slight eccentricity and/or slight pivoting and/or rotation about its longitudinal axis of the cooling and lubricating gasket valve 2 with respect to the cylindrical body 6.

Finally, FIGS. 1 to 9 show that the hydraulic piston 1 with a cooling and lubricating gasket valve 2 according to the invention comprises at least one valve return spring 30 which tends to move the cooling and lubrication gasket valve 2 away from the cylindrical body 6, said spring possibly being of any type known to those skilled in the art and made of any elastic material without any restriction.

As shown in FIGS. 1 to 6 and FIG. 8, the valve return spring 30 may be wholly or partly housed inside the intermediate fluid outlet chamber 29.

Figure 2:
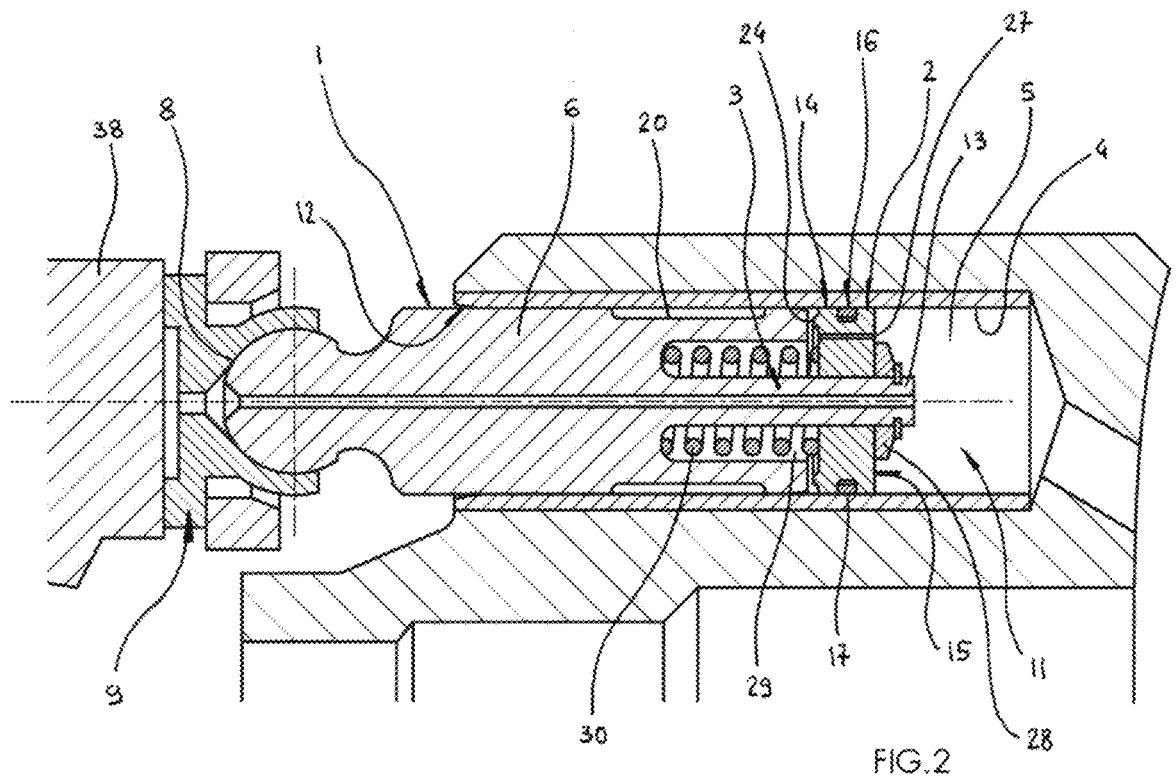
FIG. 2 is a schematic cross-sectional view of the hydraulic piston with a cooling and lubricating gasket valve according to the invention, the valve link-stop being constituted by a link-stop pin while a cutting segment forms the sealing means.

In FIGS. 1 and 2 and in FIGS. 4 to 7, it can be seen that the sealing means 16 can be constituted by at least one cutting segment 17 housed in a segment groove 18 provided in the cooling and lubricating gasket valve 2 or added wholly or partly to said valve 2, said groove 18 opening out at the level of the external cylindrical valve surface 14.

It will be noted that the profile of said segment 17 may be curved or of any geometry while the external surface of said segment 17 can be kept pressed against the inner wall of cylinder 4 under the effect of the pressure of fluid 11 contained in hydraulic chamber 5.

For improved sealing, a plurality of cutting segments 17 may be housed in the same segment groove 18. In this case, advantageously, the slicing of the segments 18 may be angularly offset to form a more efficient dam for the fluid flow 11 of any leakage at the level of said segments 18.

Figure 3:
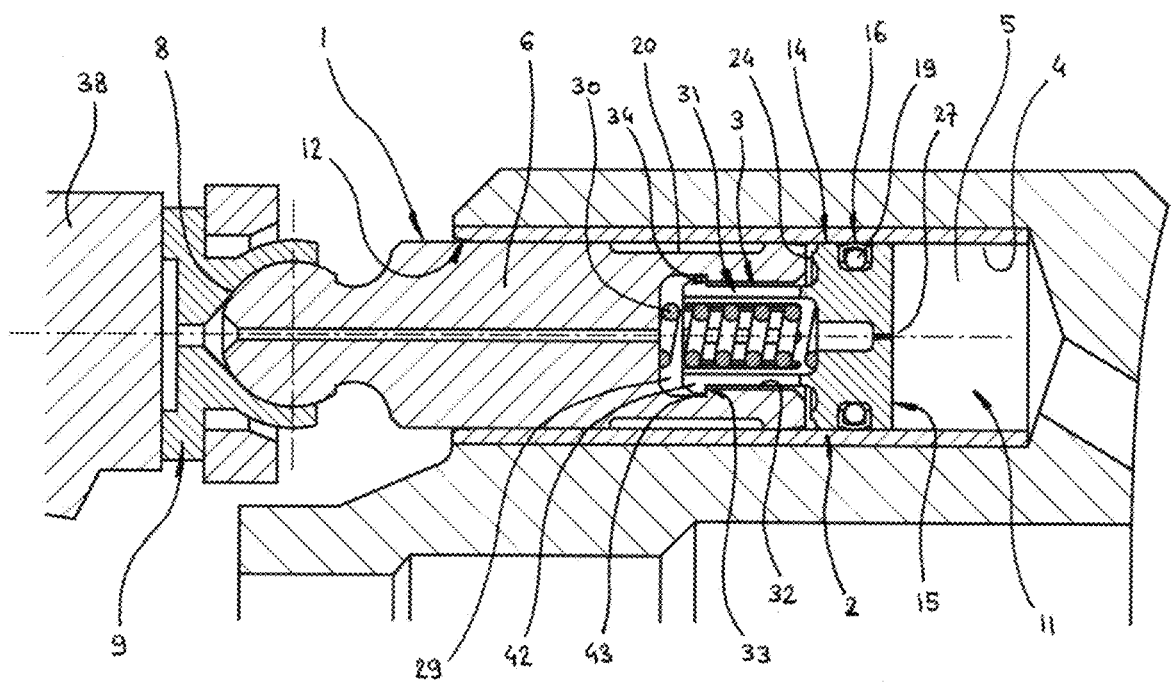
FIG. 3 is a schematic cross-sectional view of the hydraulic piston with a cooling and lubricating gasket valve according to the invention, the valve link-stop being constituted by a valve link-stop extension which exposes an extension stop constituted by flexible claws which snap into an abutment groove, while a flexible circular seal forms the sealing means.
Figure 9:
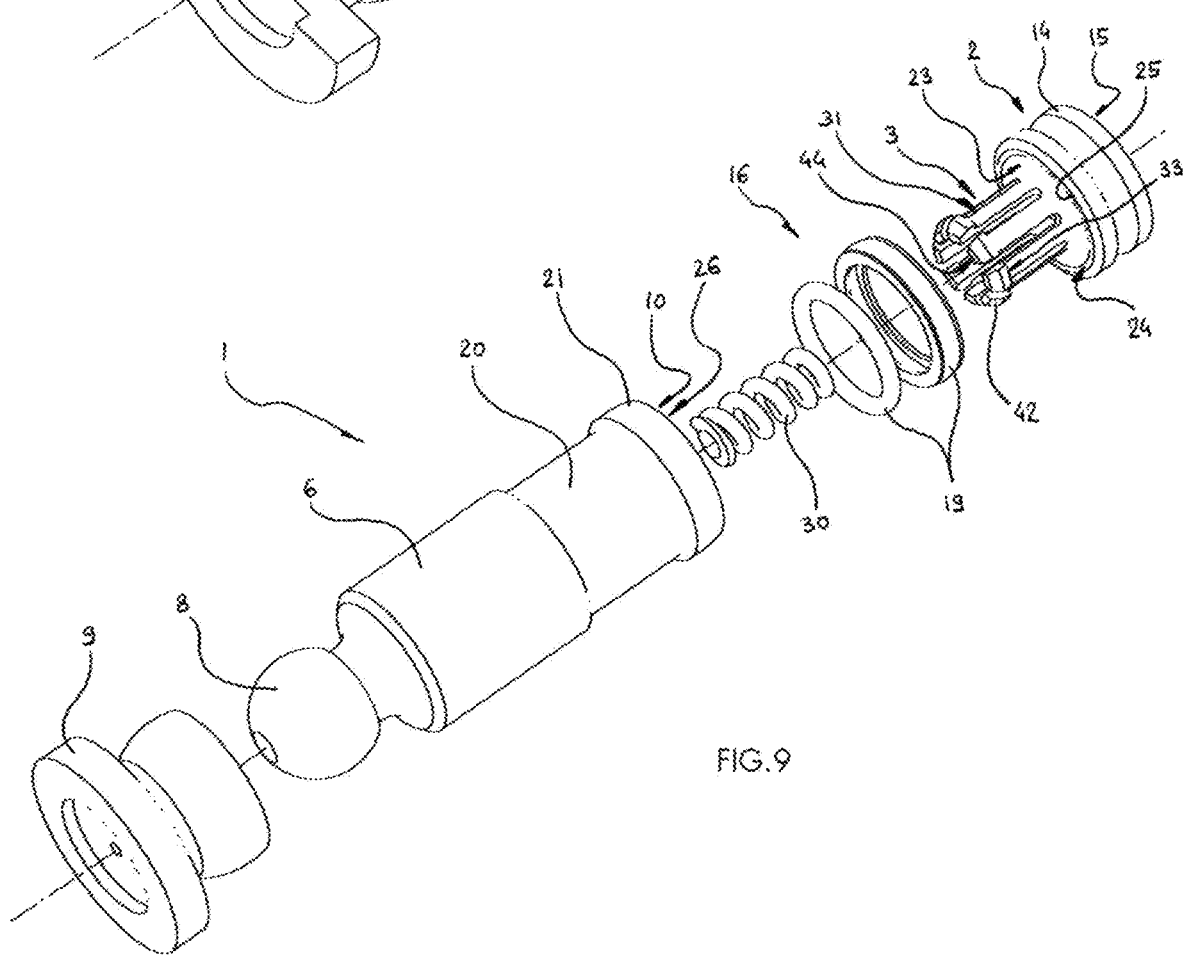
FIG. 9 is an exploded three-dimensional view of the variant shown in FIG. 3 of the hydraulic piston with a cooling and lubricating gasket valve according to the invention.

As a variant embodiment of the hydraulic piston 1 with a cooling and lubricating gasket valve 2 according to the invention, it has been shown in FIG. 3 and in FIGS. 8 and 9 that the sealing means 16 may be constituted by at least one flexible circular seal 19 housed in a segment groove 18 provided in the cooling and lubricating gasket valve 2 or wholly or partly attached to said valve 2, said groove 18 opening out at the external cylindrical valve surface 14.

It should be noted that the flexible circular seal 19 may for example be made of an elastomeric core or it may be of the composite type, in particular consisting of an elastomeric O-ring which operates with a plastic ring which may or may not be filled with antifriction and/or anti-abrasion particles.

In FIGS. 1 to 9, it can be seen that the cylindrical body 6 may have an anti-shearing release groove 20 which is axially arranged in an area which is not subjected to any significant contact pressure between said body 6 and the cylinder 4 during the operation of the hydraulic piston 1.

Said anti-shearing release groove 20 makes it possible in particular to reduce the shear resisting force generated by the fluid 11 included in the diametral clearance left between the cylindrical body 6 and the cylinder 4 when the hydraulic piston 1 moves, to improve the total energy efficiency of the hydraulic piston 1 according to the invention.

FIGS. 4 to 9 in particular show that the diameter of the axial end of the cylindrical body 6 located on the side of the compression surface 10 can be gradually reduced over a certain length to form a lift relief 21 which, when the hydraulic piston 1 ascends into the cylinder 4 in the direction of the hydraulic chamber 5, the force of the fluid 11 to penetrate between the said axial end of the cylindrical body 6 and the cylinder 4 at the contact between said end and said cylinder 4, to promote the establishment of hydrodynamic lubrication at the level of said contact and to reduce the frictional losses generated by the displacement of the hydraulic piston 1 in the cylinder 4.

FIGS. 2 and 3 show that the diameter of the axial end of the cylinder 4 situated opposite the hydraulic chamber 5 can gradually increase over a certain length to gradually develop a lift 12 which, when the hydraulic piston 1 ascends into the cylinder 4 in the direction of the hydraulic chamber 5, the force of the fluid 11 to penetrate between the cylindrical body 6 and said axial end of the cylinder 4 at the contact between the said end and said cylinder 4 to promote the establishment of hydrodynamic lubrication at the level of said contact and to reduce the frictional losses generated by the displacement of the hydraulic piston 1 in the cylinder 4.

FIGS. 1 and 2 and FIGS. 4 to 7 show that, according to a variant of the hydraulic piston 1 with a cooling and lubricating gasket valve 2 according to the invention, the valve link-stop 3 can be constituted by a link-stop pin 13 which emerges integrally from the compression surface 10, first, to pass through the cooling and lubricating gasket valve 2 via a link-stop opening 22 provided in said valve 2 and second, to protrude from the chamber-side axial valve surface 15 to expose to said surface 15 a valve stop 28 which determines the maximum distance between the cooling and lubricating gasket valve 2 of the cylindrical body 6.

It should be noted that the link-stop pin 13 can be attached to the cylindrical body 6 or may be made of the same piece of material as said body 6. It is also noted that the flow calibration opening 27 may consist of the clearance left between the link-stop pin 13 and the link-stop opening 22, said clearance may possibly be completed by an axial notch formed in the link-stop opening 22, said notch being made for example by broaching.

According to another variant of the hydraulic piston 1 with a cooling and lubricating gasket valve 2 according to the invention shown in FIG. 3 and in FIGS. 8 and 9, the valve link-stop 3 can be constituted by a valve link-stop extension 31 which emerges integrally from the piston-side axial valve surface 23, first, in order to penetrate into the cylindrical body 6 via a link-stop shaft 32 provided in said body 6 and, second, to expose an extension stop 33 which functions with a stop shaft 34 that exposes the link-stop shaft 32, the two said stops 33, 34 determining, when they are in contact with each other, the maximum distance from the cooling and lubricating gasket valve 2 with respect to the cylindrical body 6.

According to this latter variant, the extender stop 33 can be constituted by at least one flexible claw 42 which snaps into a stop groove 43 which forms the shaft stop 34. It will be noted that according to this particular configuration, in the connection of the hydraulic piston 1 according to the invention and more precisely, when the valve link-stop extension 31 is inserted into the link-stop shaft 32, the flexible claw 42 is designed to twist in the elastic range of the material which constitutes it in order to penetrate into the link-stop shaft 32 until it protrudes beyond the abutment groove 43 in which it relaxes in order to snap it in so that the cooling and lubricating gasket valve 2 will become permanently connected to the cylindrical body 6 from which it can no longer exit.

FIG. 3 and FIGS. 8 and 9 show that the valve return spring 30 may be wholly or partly housed in an extender recess 44 arranged axially in the valve link-stop extension 31.

Functioning of the Invention

The functioning of the hydraulic piston 1 with the cooling and lubricating gasket valve 2 according to the invention is easily understood in view of FIGS. 1 to 9.

FIG. 1 shows the hydraulic piston 1 applied to a hydraulic pump with variable displacement axial pistons 35 known per se.

When a transmission shaft 36 that has said pump 35 is rotated by a power source not shown, said shaft 36 in turn drives a rotating barrel 37, the latter being integral with said shaft 36.

When an inclinable plate 38, which comprises said pump 35, tilts concomitantly, the hydraulic pistons 1 of said pump 35 begin to move back and forth in the cylinder 4 with which they operate. As a result of said turns and returns, said pistons 1 aspirate fluid 11 into an inlet conduit 39 which is supplied with said fluid 11 under a low pressure of, for example, twenty bars, and then expels said fluid 11 into a discharge conduit 40 in which fluid 11 is carried at a pressure of, for example, four hundred bars.

It will be assumed here that the diametral clearance left between the cylindrical body 6 of the hydraulic piston 1 according to the invention and the cylinder 4 with which it operates is, by way of non-limiting example, on the order of ninety to one hundred micrometers, or significantly greater than that of the approximately twenty to forty micrometers commonly left between the piston and the cylinder 4 of axial piston hydraulic pumps with variable displacement 35 according to the Prior Art. In fact, according to the hydraulic piston 1 according to the invention, said diametral clearance is no longer determined on the basis of sealing criteria. On the contrary, a certain permeability is sought, but mainly on quality guidance criteria generating the fewest losses possible due to friction and wear.

It will also be assumed here that, as illustrated in FIGS. 1, 2 and 4 to 7, the cooling and lubricating gasket valve 2 which comprises each hydraulic piston 1 exposes the sealing means 16 constituted by a cutting segment 17 housed in a segment groove 18 provided in said valve 2 and emerging at the level of the external cylindrical surface of the valve 14.

The curved profile of said segment 17 can be seen in said FIGS. 1, 2 and 4 to 7 and, more precisely, of the external surface of said segment 17 which is here intended to be kept plated on the internal wall of cylinder 4 under the effect of the pressure of the fluid 11 contained in the hydraulic chamber 5.

Thus, said cutting segment 17 passes successively from the "parked" state when the pressure prevailing in the hydraulic chamber 5 with which it works is twenty bars, in the "sealed" state with the cylinder 4 when the pressure prevailing in said chamber 5 is four hundred bars.

The tight seal that the cutting segment 17 carries out with the cylinder 4 when the pressure prevailing in the hydraulic chamber 5 is four hundred bars, leaks very little fluid 11 between said segment 17 and said cylinder 4. Similarly, when the pressure prevailing in the hydraulic chamber 5 is only twenty bars, even though said segment 17 is parked, the small clearance left between said segment 17 and the cylinder 4 allows only a little fluid 11 to escape from the valve hydraulic chamber 5 via the clearance left between the external cylindrical surface of the valve 14 of the cooling and lubricating gasket valve 2 first, and the cylinder 4, second.

However, to suitably cool and lubricate the cylindrical body 6 at its contact(s) with the cylinder 4, more fluid 11 may be necessary to allow the cutting segment 17 to pass therethrough. This is because, as is clearly illustrated in FIG. 4, when the pressure prevailing in the hydraulic chamber 5 is low, the hydraulic piston 1 according to the invention, allows the supplementary fluid 11 to pass directly from the hydraulic chamber 5 to the space that constitutes the clearance left between the cylindrical body 6 of the hydraulic piston 1 and the cylinder 4, bypassing the cutting segment 17.

Figure 4:
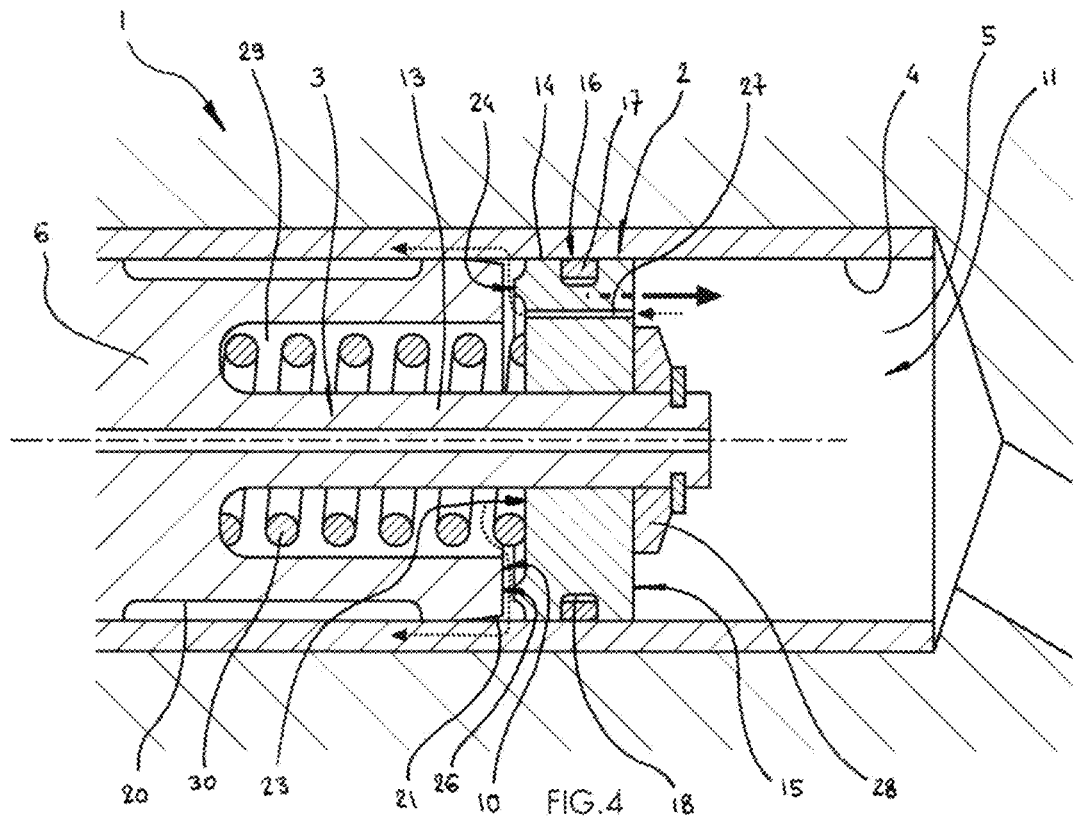
FIGS. 4 and 5 are close-up views in cross-sectional schematic section of the variant of the hydraulic piston with a cooling and lubricating gasket valve according to the invention shown in FIG. 2, FIGS. 4 and 5 respectively illustrating the operation of said variant when the pressure in the hydraulic chamber is low, and then high.

As can be seen in FIG. 4, according to the hydraulic piston 1 according to the invention, said supplementary fluid 11 can in fact pass first via the flow calibration opening 27 which passes through the cooling and lubricating gasket valve 2 in the axial direction, the hydraulic chamber 5 communicating with the intermediate fluid outlet chamber 29 via said opening 27, then via the intermediate fluid outlet chamber 29, and finally via the clearance left between the circular flow closure seal 24 and the valve contact surface 26.

It will be noted that this last clearance only exists when the pressure prevailing in the hydraulic chamber 5 is low, that is to say in the vicinity of twenty bars according to the non-limiting example illustrated here.

Indeed, as can easily be deduced from FIG. 4, when the pressure prevailing in the hydraulic chamber 5 is only twenty bars, the force exerted by the pressure of the fluid 11 on the axial face of the valve on the chamber side 15 is lower than the force exerted by the return valve spring 30 on the axial surface of the valve on the piston side 23.

As a result, the cooling and lubricating gasket valve 2 remains away from the cylindrical body 6 which leaves a clearance between the circular flow closing seal 24 and the valve contact surface 26, said clearance allowing a flow rate of the fluid 11 which cools and lubricates said body 6 at its contact(s) with the cylinder 4.

It should be noted that the diameter and the length of the flow calibration opening 27 are designed to produce the pressure drop required for obtaining at low pressure, which is according to this example of twenty bars, the desired flow rate of fluid 11 through the clearance left between the cylindrical body 6 and the cylinder 4.

It will also be noted that the force exerted by the fluid 11 on the axial face of the valve on the chamber side 15 corresponds approximately to the product of the pressure of said fluid 11 by the area of the section of the cylinder 4 reduced by the section defined by the inside of the circular flow closure seal 24. This is true if the pressure prevailing in the hydraulic chamber 5 is identical to the pressure prevailing in the intermediate fluid outlet chamber 29 first, and the pressure in the clearance left between the cylindrical body 6 and the cylinder 4 is second, which is not exactly the case in practice.

Thus, the pressure prevailing in the hydraulic chamber 5 above, upon which the cooling and lubricating gasket valve 2 is closed—i.e., above which the circular flow closure seal 24 is in contact with the valve contact surface 26—depending on the ratio between the loss and the stiffness of the valve return spring 30 first, and the area defined by the inside of the circular flow closure bearing surface 24, second. To this must be added the various pressure losses which are placed in series on the path of the fluid 11, and which are detailed below.

If the hydraulic piston 1 according to the invention is designed so that the force exerted by the pressure of the fluid 11 on the axial face of the valve on the chamber side 15 becomes greater than the force exerted by the return valve spring 30 on the axial surface of the valve on the piston side 23 from a pressure of twenty-five bars prevailing in the hydraulic chamber 5 and that, taking into account the stiffness of the valve return spring 30, the cooling and lubricating gasket valve 2 is completely closed at thirty-five bar, then, the fluid 11 for cooling and lubricating the cylindrical body 6 will pass through the flow calibration opening 27 as long as the pressure in the hydraulic chamber 5 is less than thirty-five bars.

Also, the ratio between the flow rate of the cooling and lubricating fluid 11 and the pressure prevailing in the hydraulic chamber 5 is thus well fixed firstly, by the pressure drop constituted by the flow calibration opening 27 to which the sum of the pressure losses encountered is added along its path by the fluid 11 flowing between the hydraulic chamber 5 and the outlet of the cylinder 4 opposite said chamber 5, and, secondly, by the force produced by the valve return spring 30.

It should be noted that the total energy lost due to said flow of fluid 11 deliberately generated by the hydraulic piston 1 according to the invention remains in all cases low, since the pressure at which said flow rate takes place is low, less than thirty-five bars.

Thus, the hydraulic piston 1 with a cooling and lubricating gasket valve 2 according to the invention makes it possible to provide the cylindrical body 6 with significant additional cooling and lubrication at a lower energy cost, without jeopardizing the watertightness produced by the cutting segment 17 mentioned here by way of non-limiting example as a sealing means 16.

It is thus possible, thanks to the hydraulic piston 1 with a cooling and lubricating gasket valve 2 according to the invention, to provide a flexible circular seal 19 or a cutting segment 17 on the hydraulic pistons 1 of the watertight high pressure hydraulic pumps and motors, while generating at low pressure a leakage rate of lubricating oil and of significant cooling at the level of the diametral clearance between said pistons 1 and the cylinder 4 with which they operate, at the price of a minimum reduction in the volumetric and energetic efficiency of the hydraulic pump or hydraulic motor which receives said pistons 1.

This makes it possible to leave the compromise imposed by hydraulic pistons according to the Prior Art and from which results the diametral clearance usually left between said pistons and their cylinder 4. Indeed, according to the state of the art, the clearance must be large enough to allow sufficient fluid 11 to pass to lubricate and cool said pistons and to limit losses through shear and friction, but not so great as to allow too much fluid 11 to leak. This results in a dilemma which is eliminated by the hydraulic piston 1 with a cooling and lubricating gasket valve 2 according to the invention.

It should also be noted that among the new opportunities offered by the hydraulic piston 1 with a cooling and lubricating seal valve 2 according to the invention, the cylindrical body 6 may have an anti-shearing release groove 20. This particular configuration shown in FIGS. 1 to 9 is permitted since the sealing of the hydraulic piston 1 is no longer ensured by a small clearance left between said piston 1 and the cylinder 4 with which it operates, but not the sealing means 16 which may be, for example, a cutting segment 17 as shown in FIGS. 1, 2 and 4 to 7, or a flexible circular seal 19 as illustrated in FIGS. 3, 8 and 9, without compromising good lubrication and good cooling of said piston 1.

Said configuration makes it possible to greatly reduce the shear losses generated by the fluid 11 included in the diametral clearance left between the cylindrical body 6 and the cylinder 4 when the hydraulic piston 1 moves.

It will be noted that said anti-shearing release groove 20 is axially arranged in an area which is not subjected to any significant contact pressure between the cylindrical body 6 and the cylinder 4 during the operation of the hydraulic piston 1, and this has the effect of improving the total energy efficiency of the hydraulic piston 1 according to the invention.

Figure 5:
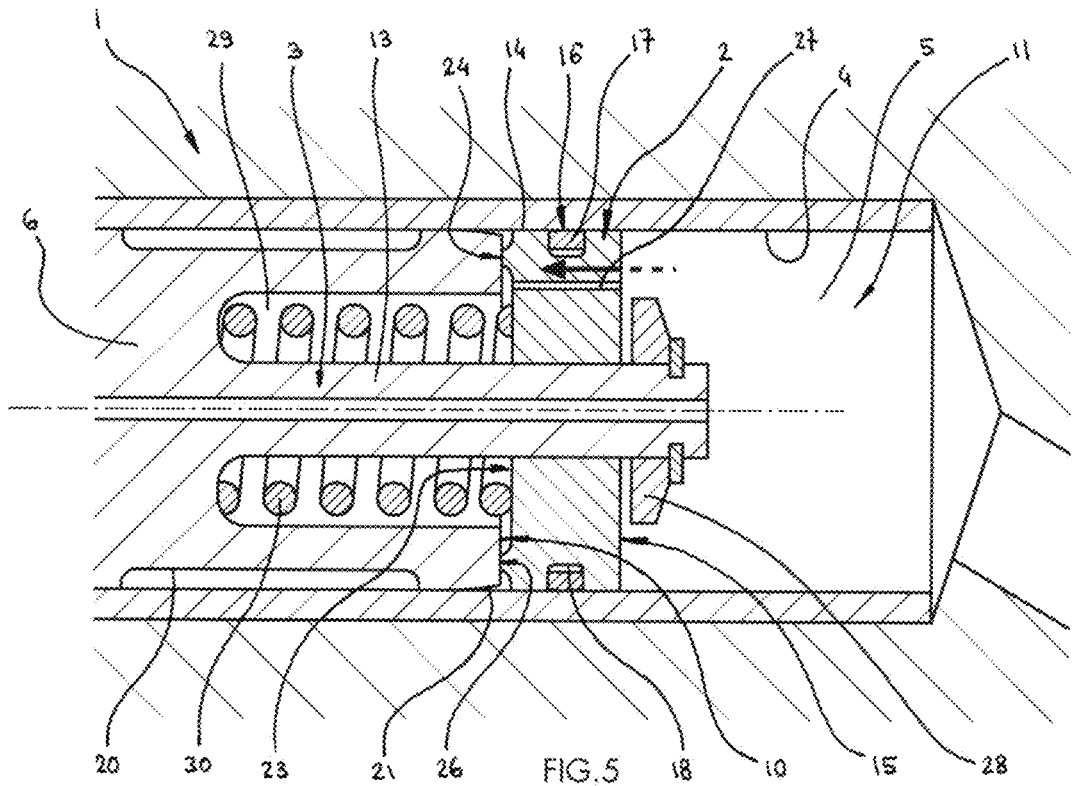
Figure 6:
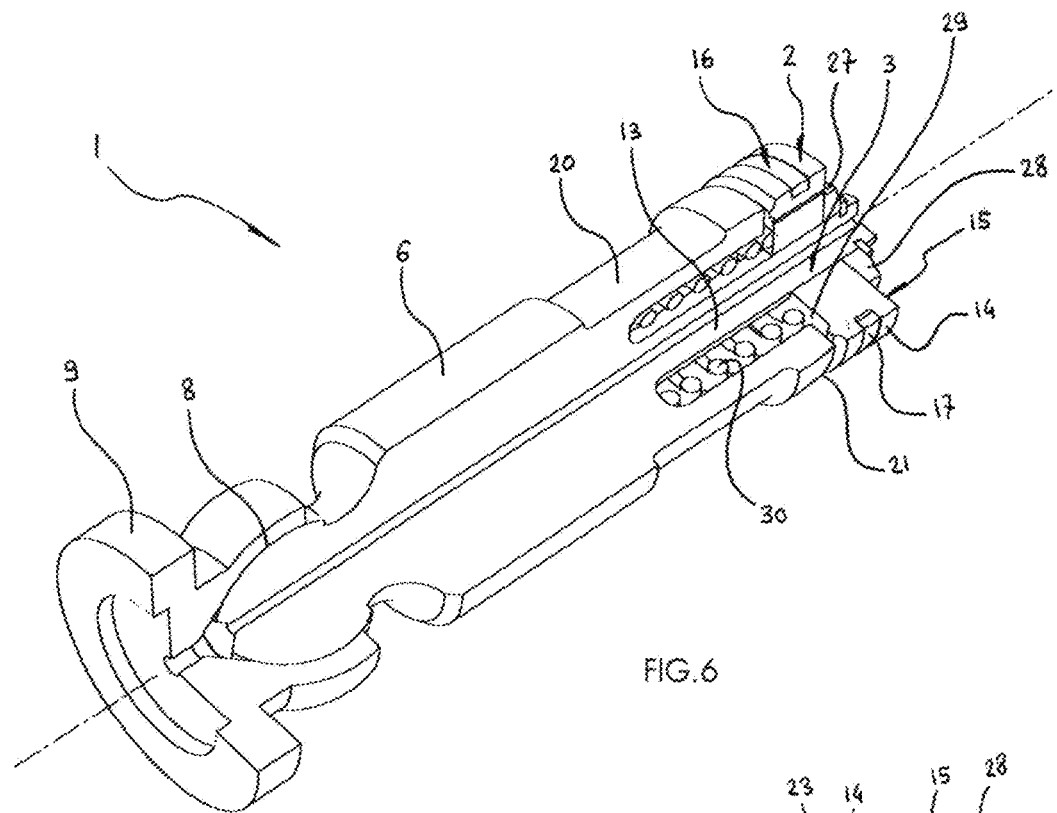
FIG. 6 is a three-dimensional cut-away view of the variant shown in FIG. 2 of the hydraulic piston with a cooling and lubricating gasket valve according to the invention, said piston being assembled.
Figure 7:
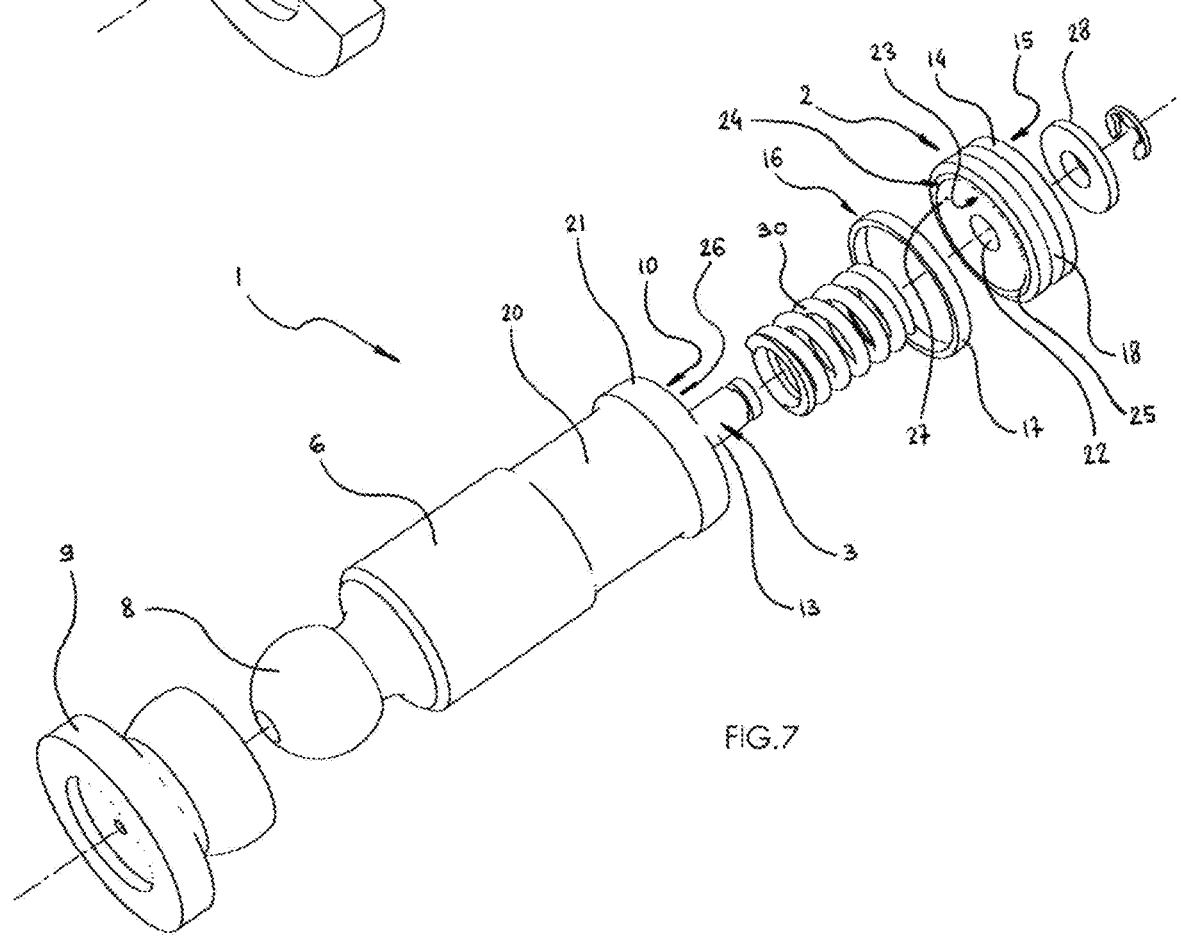
FIG. 7 is an exploded three-dimensional view of the variant shown in FIG. 2 of the hydraulic piston with a cooling and lubricating gasket valve according to the invention.

In order to further improve said efficiency, it will be noted—particularly in FIGS. 4 and 5—that the diameter of the axial end of the cylindrical body 6 situated on the side of the compression surface 10 is gradually reduced over a certain length to form a lift 21 which, when the hydraulic piston 1 ascends into the cylinder 4 in the direction of the hydraulic chamber 5, the force of the fluid 11 to penetrate between the said axial end of the cylindrical body 6 and the cylinder 4 at the contact between said end and said cylinder 4, This particular configuration of the hydraulic piston 1 according to the invention favors the establishment of a hydrodynamic lubrication regime at the level of said contact and reduces the frictional losses generated by the displacement of the hydraulic piston 1 in the cylinder 4.

For the same purpose, particularly in FIGS. 2 and 3, it can be seen that the diameter of the axial end of the cylinder 4 situated opposite the hydraulic chamber 5 gradually increases over a certain length in order to form a lift 12 which, when the hydraulic piston 1 rises in the cylinder 4 in the direction of the hydraulic chamber 5, the force of the fluid 11 to penetrate between the cylindrical body 6 and said axial end of the cylinder 4 at the contact between said end and said cylinder 4.

The possibilities of the hydraulic piston 1 with a cooling and lubricating gasket valve 2 according to the invention are not limited to the applications which have just been described, and it should be understood that the foregoing description, has been given by way of example and does not in any way limit the scope of said invention, which would not be outside that scope by replacing the execution details described by any other equivalent.

The invention claimed is:

1. A hydraulic piston (1) comprising:
   a cylindrical body (6) housed in a clearance in a cylinder (4),
   said hydraulic piston (1) being translatable in said cylinder (4) with which said hydraulic piston (1) forms a hydraulic chamber (5) of a variable volume,
   a first end of said hydraulic piston (1) having a compression surface (10) opening into the hydraulic chamber (5) for receiving pressure of a fluid (11),
   a second end of said hydraulic piston (1) having a piston support surface (8) for exerting a force on a transmission means (9),
   wherein said hydraulic piston (1) comprises:
      at least one cooling and lubricating gasket valve (2) positioned on a side of the compression surface (10) and in an extension of the cylindrical body (6) with respect to which the at least one cooling and lubricating gasket valve (2) moves in longitudinal translation over a short stroke, said at least one cooling and lubricating gasket valve (2) comprising, first, a piston-side axial valve surface (23) which has a circular flow closure contact surface (24) which comes into contact with a valve contact surface (26) on the compression surface (10), said at least one cooling and lubricating gasket valve (2) having secondly an external cylindrical valve surface (14) which exposes a sealing means (16) which comes into contact with the cylinder (4) and remain sealed, said at least one cooling and lubricating gasket valve (2) comprising, third, a chamber-side axial valve surface (15) which faces the hydraulic chamber (5);

at least one intermediate fluid outlet chamber (29) formed within the circular flow closure contact surface (24) by the piston-side axial valve surface (23) and the compression surface (10);

at least one flow calibration opening (27) which passes through the at least one cooling and lubricating gasket valve (2) mainly through an axial direction, the hydraulic chamber (5) communicating with the at least one intermediate fluid outlet chamber (29) via said at least one flow calibration opening (27);

at least one valve stop-link (3) which connects the at least one cooling and lubricating gasket valve (2) to the cylindrical body (6), said at least one valve stop-link (3) allowing said at least one cooling and lubricating gasket valve (2) to approach said cylindrical body (6) to a point that the circular flow closure contact surface (24) contacts the valve contact surface (26), while said at least one valve stop-link (3) prohibits said at least one cooling and lubricating gasket valve (2) from moving away from said cylindrical body (6) more than a certain distance; and at least one valve return spring (30) which tends to move the at least one cooling and lubricating gasket valve (2) away from the cylindrical body (6).

2. The hydraulic piston according to claim 1, wherein the at least one valve return spring (30) is wholly or partly housed within the at least one intermediate fluid outlet chamber (29).

3. The hydraulic piston according to claim 1, wherein the sealing means (16) comprises at least one cutting segment (17) housed in a segment groove (18) provided in the at least one cooling and lubricating gasket valve (2) or added wholly or partly attached to said at least one cooling and lubricating gasket valve (2), said segment groove (18) opens at the external cylindrical value surface (14).

4. The hydraulic piston according to claim 1, wherein the sealing means (16) comprises at least one flexible circular seal (19) housed in a segment groove (18) provided in the at least one cooling and lubricating gasket valve (2) or added wholly or partly attached to said at least one cooling and lubricating gasket valve (2), said segment groove (18) opens at the external cylindrical valve surface (14).

5. The hydraulic piston according to claim 1, wherein the cylindrical body (6) has an anti-shearing release groove (20).

6. The hydraulic piston according to claim 1, wherein a diameter of an axial end of the cylindrical body (6) situated on the side of the compression surface (10) gradually decreases over a certain length to form a lift relief (21).

7. The hydraulic piston according to claim 1, wherein a diameter of an axial end of the cylinder (4) opposite the hydraulic chamber (5) gradually increases over a certain length to form a lift (12).

8. The hydraulic piston according to claim 1, wherein the at least one valve link-stop (3) is constituted by a link-stop pin (13) which emerges integrally from the compression surface (10) in order to first pass through the at least one cooling and lubricating gasket valve (2) via a link-stop opening (22) provided in said at least one cooling and lubricating gasket valve (2) and, second, to project from the chamber-side axial valve surface (15) in order to expose to said chamber-side axial valve surface (15) a valve stop (28).

9. The hydraulic piston according to claim 8, wherein the at least one flow calibration opening (27) comprises a clearance left between the external cylindrical valve surface (14) and the link-stop opening (22).

10. The hydraulic piston according to claim 1, wherein the valve link-stop (3) is constituted by the valve link-stop extension (31) which emerges integrally with the piston-side axial valve surface (23), first, to penetrate into the cylindrical body (6) via a link-stop shaft (32) provided in said cylindrical body (6) and, second, to expose an extension stop (33) which works with a shaft stop (34) which is exposed by the link-stop shaft (32).

11. The hydraulic piston according to claim 10, wherein the extension stop (33) comprises at least one flexible claw (42) that snaps into an abutment groove 43 forming the shaft stop 34.

12. The hydraulic piston according to claim 10, wherein the at least one valve return spring (30) is wholly or partly housed in an extender recess (44) arranged axially in the valve link-stop extension 31.

* * * * *